No. 632,602. Patented Sept. 5, 1899.
P. B. VIELE.
FRUIT EVAPORATOR.
(Application filed Nov. 28, 1898.)
(No Model.)
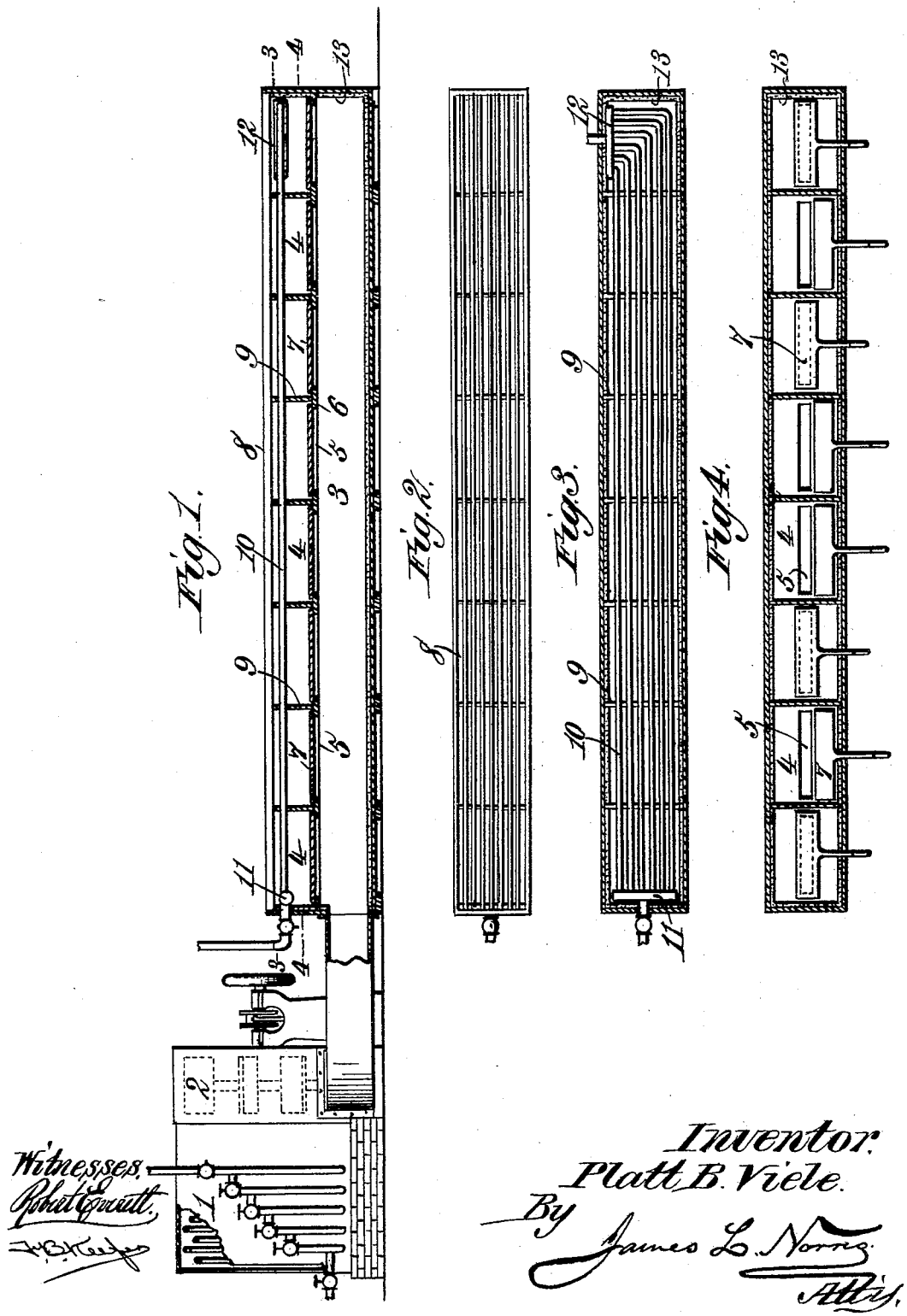

UNITED STATES PATENT OFFICE.

PLATT B. VIELE, OF ROCHESTER, NEW YORK.

FRUIT-EVAPORATOR.

SPECIFICATION forming part of Letters Patent No. 632,602, dated September 5, 1899.

Application filed November 28, 1898. Serial No. 697,659. (No model.)

*To all whom it may concern:*

Be it known that I, PLATT B. VIELE, a citizen of the United States, residing at Rochester, in the county of Monroe and State of New York, have invented new and useful Improvements in Fruit-Evaporators, of which the following is a specification.

The chief object of my invention is to provide new and improved means for rapidly and economically drying fruit to improve its appearance and quality and preserve its natural flavor without danger of discoloring, scorching, or otherwise damaging the same.

The invention also has for its object to provide novel, simple, and efficient means whereby the fruit is first partially dried by the combined action of steam heat and air specially heated before entering the drying or evaporating apparatus, and the drying or evaporating is subsequently completed by steam heat alone, the hot air being entirely cut off from the rack or support on which the sliced fruit is spread.

These objects are accomplished in the manner and by the new and improved apparatus hereinafter described and claimed, reference being made to the accompanying drawings, in which—

Figure 1 is a sectional elevation of the evaporating apparatus. Fig. 2 is a plan of the drying-rack on which is placed the material to be treated. Fig. 3 is a horizontal section on the line 3 3 of Fig. 1. Fig. 4 is a similar section on the line 4 4 of Fig. 1.

The reference-numeral 1 designates an atmospheric-air heater supplied with steam-pipes to heat the air which is drawn through the heater over the steam-pipes by an air-suction apparatus composed of a fan 2, which also serves to constantly force the hot air into a hot-air box 3, extending continuously or unbrokenly beneath a series of heat-distributing chambers 4, erected side by side above the hot-air box and separated from each other. These heat-distributing chambers 4 are adapted to communicate with the hot-air box 3 through openings 5, formed in a horizontally-arranged partition 6, that constitutes the top of the hot-air box 3 and at the same time provides a bottom for the several heat-distributing chambers. The openings 5 are controlled by valves, dampers, or horizontally-movable slides 7, so that heated air can be admitted to any distributing-chamber 4 or be cut off therefrom independently of the other heat-distributing chambers, as required.

The heat-distributing chambers 4 are open at the top, except for a perforated or slatted frame 8, that forms the top of the apparatus and affords a rack for supporting the fruit while it is being evaporated. Between the horizontal partition 6 and the slatted top or rack 8 are the vertical partitions 9, that separate the heat-distributing chambers.

There is extended through the heat-distributing chambers 4 a series of horizontally-arranged steam-pipes 10, that are situated below and adjacent to the slatted top or rack 8, on which the fruit is to be placed for evaporation. These pipes may be supplied with either live steam or exhaust-steam from any convenient source. When the fruit is put onto the rack 8 for drying, it is first subjected to the full heat of the apparatus as supplied from the hot-air box 3 and the steam-pipes 10; but after a partial drying or evaporation of the fruit the dampers 7 can be closed and the drying finished by the heat from the steam-pipes 10, and in this way the fruit is not liable to be scorched or dried too much.

The steam-pipes 10 may connect at one end with a header 11, through which steam is received, and at the other end they may connect with a header 12 for the exhaust.

It is preferable to line the bottom and sides of the hot-air box 3 with asbestos 13, so as to make said box secure against fire when it is constructed of wood and also to prevent escape of heat through any opening of seams or joints due to shrinkage of the wood.

As soon as the fruit to be evaporated has been sliced I prefer to sprinkle it with granulated sugar. This will be dissolved by the fruit-juices and absorbed by the fruit, thus causing the fruit to retain its flavor and making the dried fruit more desirable. The fruit is then spread out on the rack or slatted drying-frame 8, and the dampers 7 are opened to permit the passage of hot air from the box 3 into the several heat-distributing chambers and thence throughout the fruit. The distribution of heat to and throughout the body of fruit is regulated by the opening of some of the dampers 7 and the closing of others. When the hot-box 3 is cut off from any heat-distributing chamber 4, the fruit directly above said chamber will still be heated in some degree by the adjacent steam-pipes 10 and also through proximity to other portions of fruit from which heat has not yet been directly cut off. Before the fruit is fully dry all the dampers 7 will be closed, and the drying will be completed only by the heat of the steam-pipes. By evaporating fruit in this manner its desirable qualities will be retained and it will have a good color and flavor.

What I claim as my invention is—

1. A fruit-evaporator combining in its structure a series of heat-distributing chambers arranged side by side and separated from one another, a fruit-support extended over all of the heat-distributing chambers, a continuous hot-air box extending horizontally under the said chambers and having in its top wall a series of valve-controlled openings communicating respectively, with the chambers, an air-heater located outside the said hot-air box, a fan arranged between the air-heater and the hot-air box for drawing atmospheric air through the air-heater and forcing the heated air into said box, and a system of heating-pipes extended horizontally through the separated heat-distributing chambers between the fruit-support and the hot-air box, substantially as described.

2. The combination, in a fruit-evaporator, of a series of heat-distributing chambers arranged side by side in a horizontal plane and separated from each other, a hot-air box extending continuously under the heat-distributing chambers and having separate communications therewith, an air-heater located outside the hot-air box and having communication with one end thereof, means for forcing atmospheric air to flow through said air-heater into the hot-air box, steam heating-pipes extended through all of said separated heat-distributing chambers, and a fruit-supporting rack arranged over the latter and above said steam heating-pipes, substantially as described.

3. The combination, in a fruit-evaporator, of a series of heat-distributing chambers arranged side by side and separated from each other, a system of steam heating-pipes extended horizontally through all of the heat-distributing chambers, a fruit-supporting rack arranged over the latter and the steam heating-pipes and constituting the top of the evaporator, a hot-air box extending continuously under said chambers and having its top wall provided with valved openings to place it in communication with said chambers, an air-heater located outside the hot-air box, and an air suction and forcing apparatus connecting the said air-heater with one end of the hot-air box and serving to draw atmospheric air through the air-heater and to force the heated air into the hot-air box, substantially as described.

4. The combination, in a fruit-evaporator, of a series of separated heat-distributing chambers arranged side by side, steam heating-pipes running horizontally through all of the heat-distributing chambers, means for supporting the fruit above said chambers and steam heating-pipes, a hot-air box extending under all the heat-distributing chambers and having a series of openings in its top wall, slide-valves for placing any or all of said openings in communication with said chambers or cutting off such communication, an air-heater located outside the hot-air box and having air-heating steam-pipes, and an air suction and forcing apparatus connected with the air-heater and the hot-air box, for drawing air through the air-heater and forcing the heated air into the hot-air box, substantially as described.

In testimony whereof I have hereunto set my hand in presence of two subscribing witnesses.

PLATT B. VIELE.

Witnesses:
HENRY B. ALLEN,
GILBERT H. REYNOLDS.